US012804335B2

(12) United States Patent
Solum

(10) Patent No.: US 12,804,335 B2
(45) **Date of Patent: *Nov. 17, 2026**

(54) WIRELESS SYSTEM FOR HEARING COMMUNICATION DEVICES PROVIDING WIRELESS STEREO RECEPTION MODES

(71) Applicant: Starkey Laboratories, Inc., Eden Prairie, MN (US)

(72) Inventor: Jeffrey Paul Solum, Greenwood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 115 days.

This patent is subject to a terminal disclaimer.

(21) Appl. No.: 19/008,030

(22) Filed: Jan. 2, 2025

(65) Prior Publication Data

US 2025/0338070 A1 Oct. 30, 2025

Related U.S. Application Data

(60) Continuation of application No. 18/452,340, filed on Aug. 18, 2023, now Pat. No. 12,212,930, which is a continuation of application No. 17/646,774, filed on Jan. 3, 2022, now Pat. No. 11,765,526, which is a continuation of application No. 16/703,332, filed on Dec. 4, 2019, now Pat. No. 11,218,815, which is a (Continued)

(51) Int. Cl.

| | |
|---|---|
| ***H04R 25/00*** | (2006.01) |
| ***H04R 5/04*** | (2006.01) |
| ***H04S 1/00*** | (2006.01) |
| *H04R 1/10* | (2006.01) |
| *H04R 5/033* | (2006.01) |

(52) U.S. Cl.

CPC ............. *H04R 25/552* (2013.01); *H04R 5/04* (2013.01); *H04R 25/554* (2013.01); *H04S 1/007* (2013.01); *H04R 1/1041* (2013.01); *H04R 5/033* (2013.01); *H04R 25/505* (2013.01); *H04R 25/558* (2013.01); *H04R 2225/55* (2013.01); *H04R 2420/07* (2013.01)

(58) Field of Classification Search

CPC ...... H04R 5/04; H04R 25/554; H04R 1/1041; H04R 5/033; H04R 25/505; H04R 25/558; H04R 25/552; H04R 2225/55; H04R 2420/07; H04S 1/007

See application file for complete search history.

(56) References Cited

U.S. PATENT DOCUMENTS

2006/0274747 A1* 12/2006 Duchscher ............ H04L 65/613 370/389

OTHER PUBLICATIONS

"U.S. Appl. No. 18/313,111, Notice of Allowance mailed Mar. 12, 2025", 13 pgs.

(Continued)

*Primary Examiner* — Tuan D Nguyen

(74) *Attorney, Agent, or Firm* — Schwegman Lundberg & Woessner, P.A.

(57) ABSTRACT

The present subject matter relates to the wireless stereo reception of first and second audio information by wireless hearing communication devices. One type of device which may employ the present subject matter is a hearing assistance device, such as a hearing aid. Various forms and protocols of signal transmission are employed in varying embodiments. The present subject matter includes various communication modes such as eavesdropping modes and relaying modes.

20 Claims, 3 Drawing Sheets

Related U.S. Application Data division of application No. 15/851,953, filed on Dec. 22, 2017, now Pat. No. 10,511,918, which is a continuation of application No. 15/061,309, filed on Mar. 4, 2016, now Pat. No. 9,854,369, which is a continuation of application No. 13/970,368, filed on Aug. 19, 2013, now Pat. No. 9,282,416, which is a continuation of application No. 13/270,860, filed on Oct. 11, 2011, now Pat. No. 8,515,114, which is a continuation of application No. 11/619,541, filed on Jan. 3, 2007, now Pat. No. 8,041,066.

(56) References Cited

OTHER PUBLICATIONS

"U.S. Appl. No. 18/452,340, Notice of Allowance mailed Sep. 26, 2024", 10 pgs.
"U.S. Appl. No. 18/452,340, Preliminary Amendment filed Jan. 8, 2024", 5 pgs.
"U.S. Appl. No. 18/452,340, Supplemental Notice of Allowability mailed Oct. 17, 2024", 2 pgs.
"U.S. Appl. No. 18/452,340, Supplemental Notice of Allowability mailed Dec. 9, 2024", 3 pgs.

* cited by examiner

WIRELESS SYSTEM FOR HEARING COMMUNICATION DEVICES PROVIDING WIRELESS STEREO RECEPTION MODES

Related Application

This application is a continuation of U.S. patent application Ser. No. 18/452,340, filed Aug. 18, 2023, which is a continuation of U.S. patent application Ser. No. 17/646,774, filed Jan. 3, 2022, now issued as U.S. Pat. No. 11,765,526, which is a continuation of U.S. patent application Ser. No. 16/703,332,filed Dec. 4, 2019, now issued as U.S. Pat. No. 11,218,815; which is a divisional of U.S. patent application Ser. No. 15/851,953, filed Dec. 22, 2017,now issued as U.S. Pat. No. 10,511,918, which is a continuation of U.S. patent application Ser. No. 15/061,309, filed Mar. 4, 2016, now issued as U.S. Pat. No. 9,854,369, which is a continuation of U.S. patent application Ser. No. 13/970,368, filed Aug. 19, 2013, now issued as U.S. Pat. No. 9,282,416, which is a continuation of U.S. patent application Ser. No. 13/270,860, filed Oct. 11, 2011, now issued as U.S. Pat. No. 8,515,114, which is a continuation of U.S. patent application Ser. No. 11/619,541, filed Jan. 3, 2007, now issued as U.S. Pat. No. 8,041,066, all of which are incorporated herein by reference in their entirety.

FIELD OF THE INVENTION

This application relates generally to hearing communication devices, and more particularly to a wireless system for hearing communication devices providing wireless stereo reception modes.

BACKGROUND

Modern hearing communication devices that offer stereo reception typically require a wire between the left and right devices. For example, wireless stereo headsets generally include a stereo receiver and a wired connection to feed both the left and right speakers with the stereo connection. Such devices are not readily applied to other hearing communication devices, such as hearing aids. This is in part because wires are inconvenient, prone to breakage and can be less aesthetically pleasing to users who wish to conceal or downplay their use of hearing aids or other hearing communication devices.

Thus, there is a need in the art for an inconspicuous, robust, and elegant system for communicating stereo information to a wearer of hearing communication devices. The system should be convenient to use and to manufacture.

SUMMARY

This application addresses the foregoing needs in the art and other needs not discussed herein. The various embodiments described herein relate to wireless systems for hearing communication devices providing wireless stereo reception modes.

The present subject matter relates to the wireless stereo reception of first and second audio information by hearing communication devices. One type of device which may employ the present subject matter is a hearing aid. Various forms and protocols of signal transmission are employed in varying embodiments. The present subject matter includes various communication modes such as eavesdropping modes and relaying modes.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings.

DETAILED DESCRIPTION

In the following detailed description specific details are set forth to generally demonstrate various embodiments of the invention and to allow one of skill in the art to make and use the invention in its various forms. Thus, the following detailed description is not intended to provide an exclusive or exhaustive treatment of the present subject matter.

It should be noted that references to "an", "one", or "various" embodiments in this disclosure are not necessarily to the same embodiment, and such references contemplate more than one embodiment.

Figure 1:
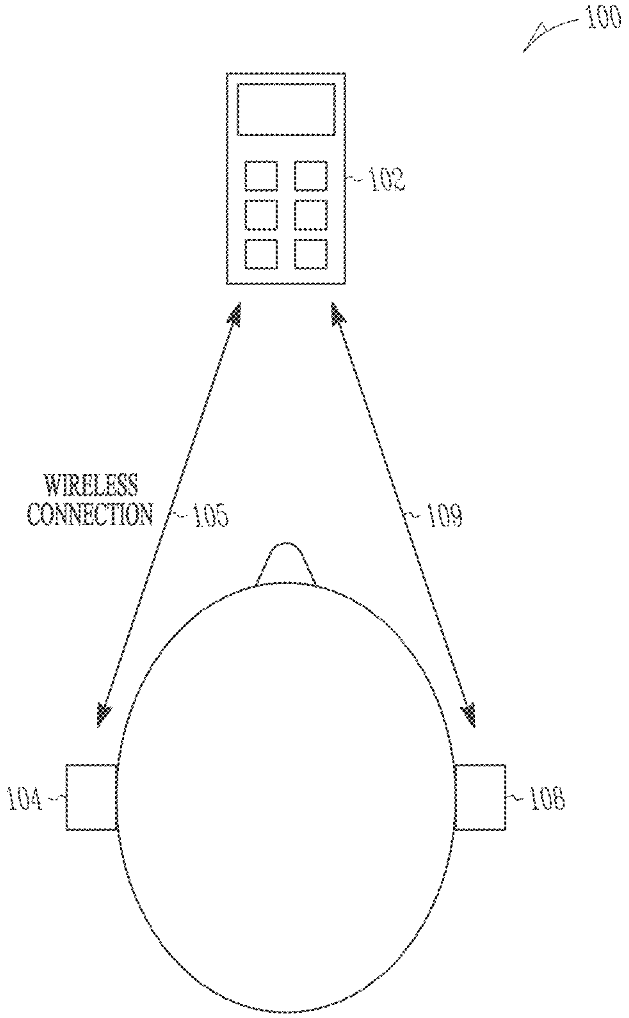
FIG. 1 shows one system using wireless devices in a direct communication mode according to one embodiment of the present subject matter.

FIG. 1 shows one system 100 using wireless devices in a direct communication mode with a remote source 102 according to one embodiment of the present subject matter. Remote source 102 transmits signals 105 to the first hearing communication device 104 including first audio information. Remote source 102 also transmits signals 109 to the second hearing communication device 108 including second audio information. In this embodiment, the first hearing communication device 104 does not have a wireless connection to the second hearing communication device 108 for transmitting stereo information from the first hearing communication device 104 to the second hearing communication device 108. Thus, the first audio information is wirelessly received by the first hearing communication device 104 and played to a first ear of the wearer and the second audio information is wirelessly received by the second hearing communication device 108 and played to the second ear of the wearer.

Figure 2:
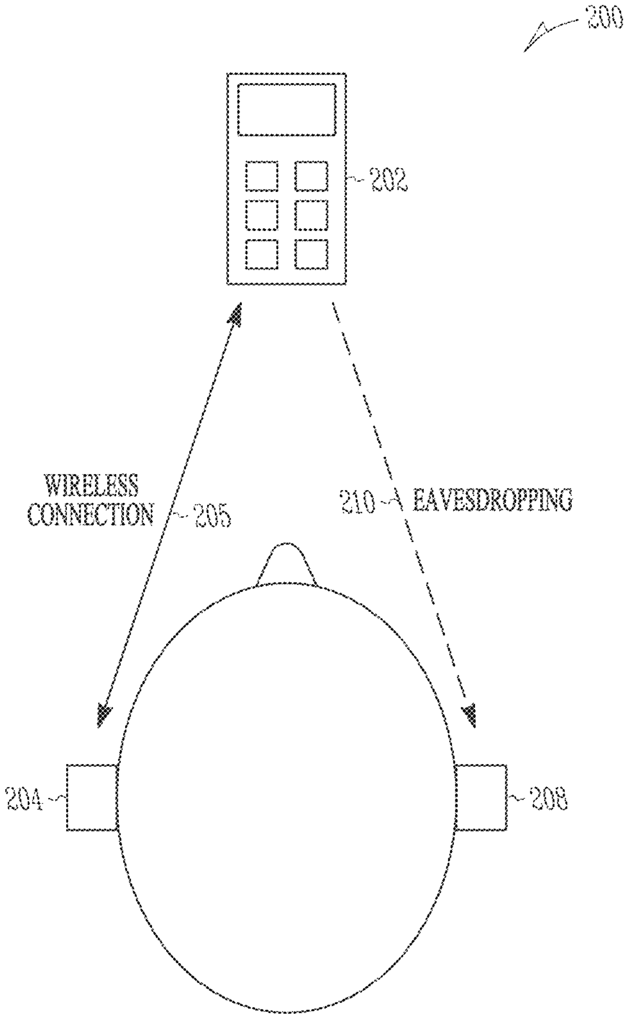
FIG. 2 shows one application using wireless devices in an eavesdropping communication mode according to one embodiment of the present subject matter.

The system in various embodiments can also support eavesdropping modes. For example, as shown in FIG. 2, in system 200 remote source 202 is in communications with first hearing communication device 204 via signals 205. Second hearing communication device 208 can "listen in" on communications from remote source 202 using a mode that is different than the mode used by the first hearing communication device 204. For instance, it is possible that second hearing communication device 208 receives signals 210, but does not control, for example, handshaking with remote source 202 to the same extent as first communication device 204. Other eavesdropping modes can be employed without departing from the scope of the present subject matter.

Figure 3:
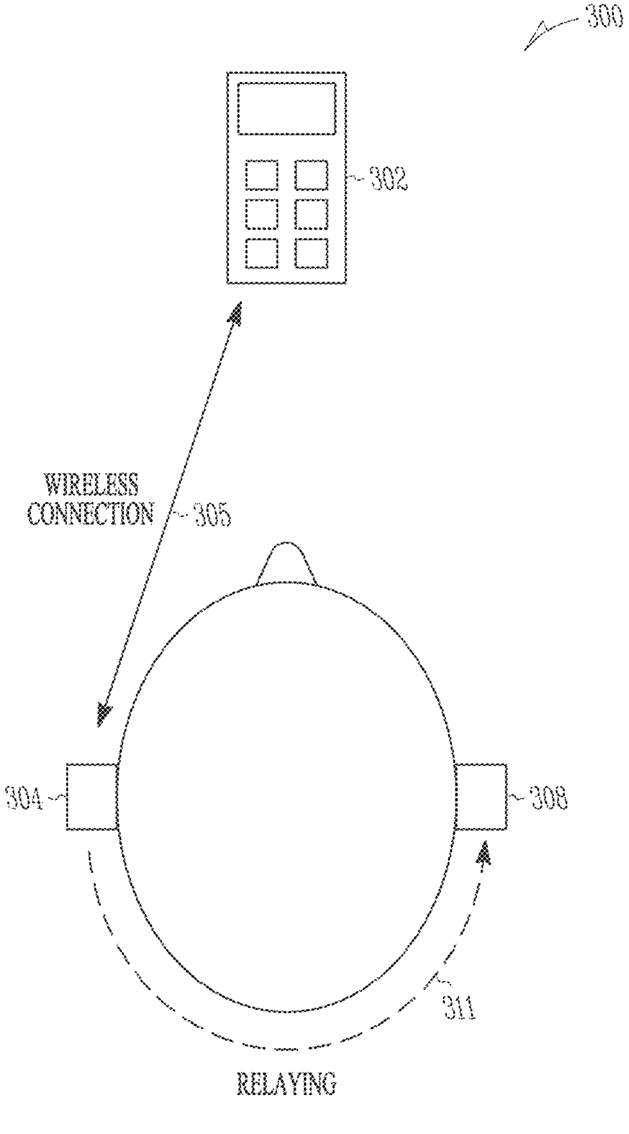
FIG. 3 shows one application using wireless devices in a relaying communication mode according to one embodiment of the present subject matter.

FIG. 3 depicts one embodiment where a relaying mode is employed to communicate wirelessly between the first hearing communication device 304 and the second hearing communication device 308. In this embodiment, first and second audio information is sent over signal 305 to the first hearing communication device 304. The second audio information is then relayed to the second hearing communication device 308 via relay signal 311. Such relay may be performed using different frequencies, different communication modes and with different data rates, for different implementations if desired. In one embodiment, the first hearing communication device 304 may demodulate and decode stereo information and encode and relay the channel bound for the instrument on or in the other ear. In various embodiments, the communications can be made using similar transmissions to the primary transmission. In various embodiments, the communications can be maded using a different method than that of the primary transmission. In various embodiments, the signals 305 and 311 are unidirectional. In various embodiments, the signals 305 and 311 are bidirectional. In various embodiments, the signals 305 and 311 are programmably combinations of unidirectional and/or bidirectional. Thus, the system 300 is highly programmable to adapt to a number of communication requirements and applications. In one embodiment, relay signal 311 is a substantially magnetically coupled or near field communication link. In one embodiment, a telecoil is employed to receive the relay signal 311. In one embodiment, a magnetic sensor is used to receive the relay signal 311. In one embodiment, relay signal 311 is a radio frequency or far field communication link. Other communication links, such as infrared and ultrasonic may be employed in various applications.

In the various embodiments and applications provided herein, different communications electronics are used by the systems (e.g., 100, 200, 300) to provide different communication modes for the stereo information. For example, in one embodiment a first channel and a second channel are employed to communicate the stereo information to the first and second ears, respectively. In one embodiment, the electronics includes frequency division multiplexed communications electronics. In one embodiment, the electronics includes time division multiplexed communications electronics. In one embodiment, the electronics includes code division multiplexed communications electronics. In one embodiment, the electronics includes packetized communications electronics. In one embodiment, the electronics includes analog communications electronics. In one embodiment, the electronics includes frequency modulated communications electronics. In one embodiment, the electronics includes single sideband communications electronics. In one embodiment, the electronics includes amplitude modulated communications electronics. In one embodiment, the electronics includes phase modulated communications electronics. Other modulation and communications embodiments are within the scope of the present subject matter and those examples provided herein are intended to demonstrate the flexibility and adaptability of the present subject matter.

The systems (e.g., 100, 200, and 300) in various embodiments can also support communications modes where the first audio information and the second audio information are the same or substantially the same audio information.

In various embodiments, the remote source (e.g., 102, 202, and 302) supports one or more communication protocols. In various embodiments, communications of far field signals are supported. Some embodiments employ 2.4 GHz communications. In various embodiments the wireless communications can include standard or nonstandard communications. Some examples of standard wireless communications include, but are not limited to, FM, AM, SSB, BLUETOOTH™, IEEE 802.11 (wireless LANs) wi-fi, 802.15 (WPANs), 802.16 (WiMAX), 802.20, and cellular protocols including, but not limited to CDMA (code division multiple access) and GSM, ZigBee, and ultra-wideband (UWB) technologies. Such protocols support radio frequency communications and some support infrared communications. Other available forms of wireless communications include ultrasonic, optical, and others. It is understood that the standards which can be used include past and present standards. It is also contemplated that future versions of these standards and new future standards may be employed without departing from the scope of the present subject matter.

Such remote sources (e.g., 102, 202, and 302) include, but are not limited to, cellular telephones, personal digital assistants, personal computers, streaming audio devices, wide area network devices, local area network devices, personal area network devices, and remote microphones. In various embodiments, the remote source includes one or more of the interface embodiments demonstrated in U.S. Provisional Patent Application Ser. No. 60/687,707, filed Jun. 5, 2005, entitled: COMMUNICATION SYSTEM FOR WIRELESS AUDIO DEVICES, and U.S. patent application Ser. No. 11/447,617, filed Jun. 5, 2006, entitled: COMMUNICATION SYSTEM FOR WIRELESS AUDIO DEVICES which claims the benefit of the provisional application the entire disclosures of which are hereby incorporated by reference. In various embodiments, one or more of the hearing communication devices use the radio technology provided in Provisional Patent Application Ser. No. 60/687,707, and U.S. patent application Ser. No. 11/447,617, both of which are incorporated by reference in their entirety. In various embodiments a low power system is provided to allow communications between the remote sources and one or more hearing communication devices.

In the embodiments demonstrated herein, the listener has first and second hearing communication devices. In various embodiments, such devices include, but are not limited to, various types of hearing aids. In one embodiment, at least one wireless hearing assistance device is a behind-the-car hearing aid. In one embodiment, at least one wireless hearing assistance device is an in-the-car hearing aid. In one embodiment, at least one wireless hearing assistance device is a completely-in-the-canal hearing aid. In one embodiment, at least one wireless hearing assistance device is a wireless earpiece. Various examples of wireless adapters for some hearing assistance devices using a direct-audio input (DAI) interface are demonstrated in U.S. patent application Ser. No. 11/207,591, filed Aug. 18, 2005, entitled "WIRELESS COMMUNICATIONS ADAPTER FOR A HEARING ASSISTANCE DEVICE;" and PCT Patent Application No. PCT/US2005/029971, filed Aug. 18, 2005, entitled "WIRELESS COMMUNICATIONS ADAPTER FOR A HEARING ASSISTANCE DEVICE," the entire disclosures of which are incorporated by reference.

The wireless hearing communication devices can contain a microphone to receive sounds. Some examples include a microphone for reception of ambient sound, which can be encoded and transmitted by the wireless hearing assistance device. Another example is a microphone adapted for reception of speech by the wearer of the device. The speech can be encoded and transmitted by the wireless hearing assistance device. It is understood that in certain embodiments, the wireless hearing communication devices may be wireless hearing assistance devices. One type of hearing assistance device is a hearing aid. Other wireless communication devices may be employed having various information to communicate. Thus, the devices can support bidirectional communication modes.

In various embodiments, the communications between the remote source and one or more wireless communication devices are unidirectional. In various embodiments, the communications between the remote source and one or more wireless communication devices are bidirectional. In various embodiments, the communications include at least one unidirectional communication and one bidirectional communication. Thus, the system is highly programmable to adapt to a number of communication requirements and applications. In relaying embodiments, it is understood that the communications can be unidirectional or bidirectional.

It is understood that the examples set forth herein can be applied to a variety of wireless devices and primary and secondary device combinations. Thus, the examples set forth herein are not limited to cell phone applications.

This description has set forth numerous characteristics and advantages of various embodiments and details of structure and function of various embodiments, but is intended to be illustrative and not intended in an exclusive or exhaustive sense. Changes in detail, material and management of parts, order of process and design may occur without departing from the scope of the appended claims and their legal equivalents.

What is claimed is:

1. An apparatus, comprising:

wireless communication electronics configured to eavesdrop on wireless communications between a first ear-wearable device and a remote source, wherein the wireless communications include first and second audio information, and wherein the wireless communication electronics do not control handshaking with the remote source to a same extent as the first ear-wearable device.

2. The apparatus of claim 1, wherein the wireless communications include Bluetooth communications.

3. The apparatus of claim 1, wherein the remote source includes a cellular telephone.

4. The apparatus of claim 1, wherein the remote source includes a personal computer.

5. The apparatus of claim 1, wherein the remote source includes a streaming audio device.

6. The apparatus of claim 1, wherein the wireless communication electronics are within a second ear-wearable device.

7. The apparatus of claim 6, wherein the first ear-wearable device is configured to be worn on or in a first ear of a wearer and the second car-wearable device is configured to be worn on or in a second ear of the wearer.

8. The apparatus of claim 7, wherein at least one of the first ear-wearable device and the second ear-wearable device is a wireless earpiece.

9. The apparatus of claim 7, wherein at least one of the first ear-wearable device or the second ear-wearable device is a hearing assistance device.

10. The apparatus of claim 9, wherein the hearing assistance device is a hearing aid.

11. A method, comprising:

using wireless communication electronics to eavesdrop on wireless communications between a first ear-wearable device and a remote source, wherein the wireless communications include first and second audio information, and wherein the wireless communication electronics do not control handshaking with the remote source to a same extent as the first ear-wearable device.

12. The method of claim 11, wherein the first and second audio information include stereo audio information.

13. The method of claim 11, further comprising:

using the first ear-wearable device to play the first audio information in a first ear of a wearer.

14. The method of claim 13, wherein the wireless communication electronics are within a second ear-wearable device.

15. The method of claim 14, further comprising:

using the second ear-wearable device to play the second audio information in a second ear of the wearer.

16. The method of claim 14, wherein the first ear-wearable device does not have a direct wireless connection to the second ear-wearable device.

17. The method of claim 14, wherein the first ear-wearable device is configured to be worn on or in a first ear of a wearer and the second ear-wearable device is configured to be worn on or in a second ear of the wearer.

18. The method of claim 17, wherein at least one of the first ear-wearable device and the second ear-wearable device is a wireless earpiece.

19. The method of claim 17, wherein at least one of the first ear-wearable device or the second ear-wearable device is a hearing assistance device.

20. The method of claim 19, wherein the hearing assistance device is a hearing aid.

* * * * *